United States Patent Office 2,772,268
Patented Nov. 27, 1956

2,772,268

SPIRO CYCLOALKANE-THIAZANEONES

Keith W. Wheeler, Wyoming, Jay K. Seyler, Cincinnati, and Marcus G. Van Campen, Jr., Wyoming, Ohio, assignors to The Wm. S. Merrell Company, a corporation of Delaware No Drawing. Application March 12, 1954,
Serial No. 415,962

4 Claims. (Cl. 260—243)

This invention relates to novel therapeutic chemical compounds. More particularly the invention relates to 6-spiro substituted m-thiazane derivatives of the class consisting of spiro [cycloalkane - 1,6' - (m - thiazane - 4-ones)] which can be represented by the generic formula:

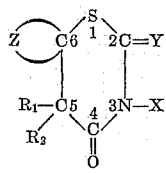

in which $R_1$, $R_2$ and X represent substituents such as H and lower alkyl radicals, Y represents an oxygen, imino or lower alkylimino radical, and Z represents a polymethylene radical, a polymethylene radical substituted with one or more lower alkyl radicals, or a polymethylene radical substituted with an alicyclic radical; the polymethylene radicals referred to having from 4 to 6 carbon atoms and having both terminal bonds of the radical attached to the carbon atom in the 6 position of the m-thiazane ring. Thus the 6 carbon atom of the m-thiazane ring is also the 1 carbon atom of the 5–7 carbon cycloalkane ring formed by the polymethylene radicals represented by Z in the formula. Further, when X and Y of the generic formula are taken together, they form with the carbon atom in the 2 position, and the nitrogen atom in the 3 position of the m-thiazane ring, a dihydro imidazo ring as shown in the formula below:

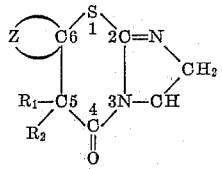

The novel compounds of our invention are useful for various therapeutic purposes. Some of the compounds have properties which make them useful as respiratory stimulants or as analeptics for the alleviation of barbiturate depression. Others possess properties which make them useful as central stimulants or convulsants. Still others have sedative properties. In general the compounds of our invention having substituents in the 5 position of the m-thiazane ring are central depressants or sedatives while the remaining compounds covered by the generic formula are, in general, stimulants or analeptics.

Our novel therapeutic compounds may be administered either orally or parenterally. The parent compounds of our invention may be administered orally without the necessity of employing the corresponding salts. The 2,4-diones of our invention, the compounds in which Y of the formula represents an oxygen group, can be employed in the form of the corresponding alkali metal salts for parenteral administration. In like manner the compounds under the generic formula in which Y is an imino or lower alkylimino radical can be administered parenterally as the corresponding addition salts formed by neutralization with a strong acid. In general, the compounds having a substituent in the 5 position of the m-thiazane ring, i. e., the sedatives of our invention are short-acting substances which are best administered intravenously.

Our novel compounds can be prepared by the reaction of a thiourea with an α-(1-bromocycloalkane) alkanoic acid in the presence of a suitable dehydrating agent and a non-aqueous solvent. We prefer to use acetic anhydride as the dehydrating agent and glacial acetic acid as the solvent. Other suitable dehydrating agents and solvents will suggest themselves to those skilled in the art. The reaction can be carried out at ambient temperatures or at elevated temperatures up to the boiling point of the solvent employed. We prefer to conduct the reaction at a temperature in the range of from about 60 to 100° C.

The reaction of a thiourea with an α-(1-bromocycloalkane) alkanoic acid in the manner described produces an imino compound which may be purified by recrystallization for use in that form or may be converted to a salt by neutralization with a strong acid and employed as the salt. The imino intermediate can be hydrolized to the corresponding 2,4-dione by heating at reflux temperature with an excess of dilute hydrochloric acid. The crude 2,4-dione may be purified by recrystallization from a mixture of petroleum ether and absolute alcohol. The corresponding alkali metal salts of the 2,4-diones can be prepared by conventional methods.

The character of the substituents represented by X and Y in the generic formula for our novel compounds is determined by the particular thiourea charged to the reaction. When thiourea itself is employed, the product of the reaction is a compound in which X is hydrogen and Y is an imino group. The imino radical may be converted to an oxygen radical by hydrolysis as noted above. When an N,N'-dialkyl thiourea is employed, products are formed in which X is alkyl and Y is alkylimino. The compounds of our invention in which X and Y taken together represent a dihydro imidazo ring are formed by charging ethylene thiourea to the reaction.

The character of $R_1$, $R_2$ and Z in the generic formula is determined by the particular α-(1-bromocycloalkane) alkanoic acid employed in the reaction. The cycloalkane ring found in the product will have the same number of carbon atoms and the same substituents as the cycloalkane ring in the acid reactant.

The character of the aliphatic acid portion of the α-(1-bromocycloalkane) alkanoic acid molecule determines the nature of $R_1$ and $R_2$. The carboxy and α carbon atoms of the aliphatic acid portion of the bromo-acid become the 4 and 5 carbon atoms of the m-thiazane ring respectively. Therefore, $R_1$ and $R_2$ are derived from H, or alkyl groups which are attached to the α carbon atom of the acid reactant employed. When α-(1-bromocycloalkane) acetic acid is employed $R_1$ and $R_2$ become H; when α-(1-bromocycloalkane) propionic acid is employed, $R_1$ and $R_2$ become H and methyl, etc.

The α-(1-bromocycloalkane) alkanoic acids employed as reactants in the production of our new compounds can be prepared by the action of fuming hydrobromic acid (approximately 67% HBr) on the corresponding α-(1-hydroxycycloalkane) alkanoic acid or upon the unsaturated acids obtained by removal of the elements of water from the hydroxy acids. The α-(1-hydroxycycloalkane) alkanoic acids can be prepared by means of a Reformatsky reaction between the appropriate cycloalkanone and α-bromoalkanoate ester to give the α-(1-hydroxycycloalkane) alkanoate ester. The ester is saponified to the acid or dehydrated and saponified to the unsaturated acid. An alternate method for the preparation of the unsaturated cycloalkane acids which is applicable to the simpler alkanones comprises the condensation of an appropriate alkanone with cyanoacetic acid in the presence of a base such a piperidine to give an unsaturated nitrile which can be converted to the desired unsaturated acid by a conventional acid or alkaline hydrolysis. Some α-(1-bromocycloalkane) alkanoic acids have been described in the literature while many others which are employed as starting materials in the preparation of the compounds of our invention are themselves new compounds. A list of bromo acids useful as intermediates in the preparation of our compounds and which we believe to be new compounds is given below. The melting points given are for analytically pure samples of the acids.

α-(1-bromo-2-methylcyclohexane) acetic acid, non-distillable oil
α-(1-bromo-3-methylcyclohexane) acetic acid, M. P. 84–85.5° C.
α-(1-bromocyclohexane) propionic acid, M. P. 91–91.5° C.
α-(1-bromocyclopentane) butyric acid, M. P. 99.5–100° C.
α-(1-bromocyclohexane) valeric acid, non-distillable oil
α-(1-bromo-3-methylcyclohexane) butyric acid, M. P. 130–132° C.
α-(1-bromo-4-methylcyclohexane) butyric acid, M. P. 98.5–99.5° C.
α-(1-bromo-4-isopropylcyclohexane) acetic acid, M. P. 92–93° C.
α-(1-bromo-3,3,5-trimethylcyclohexane) acetic acid, M. P. 86–87° C.
α-(1-bromocyclohexane) caproic acid, non-distillable oil
α-(1-bromo-4-tert.-butylcyclohexane) acetic acid, M. P. 150–151° C.
α-(1-bromo-4-sec.butylcyclohexane) acetic acid, M. P. 75–76° C.
α-(1-bromo-4-tert.-amylcyclohexane) acetic acid, M. P. 124.5–125° C.
α-(1-bromo-4-cyclohexylcyclohexane) acetic acid, M. P. 146–147° C.

The method of preparation of the novel compounds of our invention will be described in detail in the following example which is to be taken as illustrative only and is not to be construed as limiting the scope of our invention.

EXAMPLE I

A solution comprising 52 g. (0.23 mole) of α-(1-bromocyclohexane) acetic acid, 19 g. (0.25 mole) of thiourea and 250 ml. of glacial acetic acid was heated to 80–90° C. and maintained at that temperature for 30 hours. Acetic anhydride, 50 g. (0.48 mole) was added to the solution and the mixture was maintained at 90–100° C. for about 42 hours. The acetic acid was removed by vacuum distillation. The residue from the distillation was dissolved with stirring, at room temperature, in about 1 liter of a solvent made up by mixing approximately equal volumes of water and ether. The ether extract, which contained unreacted starting materials and unwanted by-products, was discarded. The acidic aqueous extract was neutralized by slowly adding sodium bicarbonate. Either solid sodium bicarbonate or a saturated aqueous solution can be employed. A crude product having a M. P. of 184–187° C. precipitated. The spiro [cyclohexane-1,6'-(2'-imino-m-thiazane-4'-one)] was recrystallized from a mixture of absolute alcohol and petroleum ether to give the pure imino compound which had a melting point of 200–202° C. The product had the following analysis:

|  | C | H | N |
|---|---|---|---|
| Percent Calculated for $C_9H_{14}ON_2S$ | 54.50 | 7.11 | 14.13 |
| Percent Found | 54.47 | 7.05 | 14.06 |

The imino compound was hydrolyzed by refluxing in excess 10% aqueous hydrochloric acid for about four hours. The product was recovered from the cooled hydrolysis mixture by filtration and recrystallized from a mixture of petroleum ether and absolute alcohol to give spiro [cyclohexane-1,6'-(m-thiazane-2',4'-dione)] having a melting point of 171–172° C. The product had the following analysis:

|  | C | H | N |
|---|---|---|---|
| Percent Calculated for $C_9H_{13}O_2NS$ | 54.25 | 6.57 | 7.03 |
| Percent Found | 54.63 | 6.68 | 7.00 |

The general procedure of Example I was duplicated in the preparation, isolation, and purification of the compounds listed in Table II below. It is to be noted that many of the compounds were obtained as a mixture of stereo isomers so that no sharp melting point was obtained. All of the compounds were identified by analytical methods. Other compounds of our invention were prepared according to the procedure of Example I by reaction of the pairs of reactants listed below in Table I. The novel compounds prepared together with their melting points in most cases, are listed in Table II below. The numbers of the compounds in Table II correspond to the numbers of the pairs of reactants in Table I. Only a single pair of reactants is given in cases where the 2',4'-dione compound was prepared by hydrolysis of the corresponding imino compound.

Table I

| α-(1-bromocycloalkane) alkanoic acid | Thiourea |
|---|---|
| 1- 2. α - (1 - bromo - 3 - methylcyclohexane) acetic acid. | Thiourea. |
| 3- 4. α - (1 - bromo - 4 - methylcyclohexane) acetic acid. | Do. |
| 5- 6. α-(1-bromo-4-isopropylcyclohexane) acetic acid. | Do. |
| 7- 8. α - (1 - bromo - 3,3,5 - trimethylcyclohexane) acetic acid. | Do. |
| 9-10. α - (1 - bromo-4-sec-butylcyclohexane) acetic acid. | Do. |
| 11. α-(1-bromo-4-tert-butylcyclohexane) acetic acid. | Do. |
| 12. α-(1-bromo 4-tert amylcyclohexane) acetic acid. | Do. |
| 13-14. α-(1-bromocyclopentane) acetic acid | Do. |
| 15. α- (1 - bromo - 4 - cyclohexylcyclohexane) acetic acid. | Do. |
| 16-17. α-(1-bromocyclohexane) butyric acid | Do. |
| 18. α-(1-bromocyclopentane) acetic acid | N,N' dimethylthiourea. |
| 19. α-(1-bromocyclopentane) acetic acid | Ethylenethiourea. |
| 20. α-(1-bromocyclohexane) acetic acid | N,N' dimethylthiourea. |
| 21. α-(1-bromocyclohexane) acetic acid | N,N' diethylthiourea. |
| 22. α-(1-bromo 4-methylcyclohexane) acetic acid. | N,N' dimethylthiourea. |
| 23. α-(1-bromo 3-methylcyclohexane) acetic acid. | N,N' diethylthiourea. |
| 24. α-(1-bromo-3-methylcyclohexane) acetic acid. | Ethylenethiourea. |
| 25. α - (1 - bromo - 4 - isopropylcyclohexane) acetic acid. | N,N'-dimethylthiourea. |
| 26. α-(1-bromo-4-tert-butylcyclohexane) acetic acid. | Do. |
| 27-28. α-(1-bromocycloheptane) acetic acid | Thiourea. |
| 29-30. α-(1-bromocyclohexane) propionic acid | Do. |
| 31-32. α-(1-bromocyclopentane) butyric acid | Do. |
| 33-34. α - (1 - bromo - 4 - methylcyclohexane) butyric acid. | Do. |
| 35. α - (1 - bromo - 3 -methylcyclohexane) butyric acid. | Do. |
| 36. α-(1-bromocyclohexane) valeric acid | Do. |
| 37. α-(1-bromocyclohexane) isovaleric acid | Do. |
| 38. α-(1-bromocyclohexane) caproic acid | Do. |
| 39. α - (1 - bromo- 3,3,5 - trimethylcyclohexane) butyric acid. | Do. |
| 40. α - (1 - bromocyclohexane) heptanoic acid. | Do. |
| 41. α-(1-bromocyclohexane) isobutyric acid. | Do. |
| 42-43. α - (1 - bromo - 2 - methylcyclohexane) acetic acid. | Do. |

Table II

| Compounds Prepared | Melting Point |
| --- | --- |
| 1. Spiro [3-methylcyclohexane-1,6'-(2'-imino-m-thiazane-4'-one)]. | 194–194.5° C. |
| 2. Spiro [3-methylcyclohexane-1,6'-(m-thiazane-2',4'-dione)]. | 127–129° C. |
| 3. Spiro [4-methylcyclohexane-1,6'-(2'-imino-m-thiazane-4'-one)]. | 196–197° C. |
| 4. Spiro [4-methylcyclohexane-1,6'-(m-thiazane-2',4'-dione)]. | 138–139° C. |
| 5. Spiro [4-isopropylcyclohexane-1,6'-(2'-imino-m-thiazane-4'-one)]. | 214–215° C. |
| 6. Spiro [4-isopropylcyclohexane-1,6'-(m-thiazane-2',4'-dione)]. | 175–176° C. |
| 7. Spiro [3,5-trimethylcyclohexane-1,6'-(2'-imino-m-thiazane-4'-one)]. | 198–199° C. |
| 8. Spiro [3,3,5-trimethylcyclohexane - 1,6' - (m - thiazane-2',4'-dione)]. | 130–150° C.[1] |
| 9. Spiro [4-sec-butylcyclohexane-1,6'-(2'-imino-m-thiazane-4'-one)]. | 214–214.5° C. |
| 10. Spiro [4 - sec - butylcyclohexane - 1,6' - (m - thiazane-2',4'-dione)]. | 154.5–155° C. |
| 11. Spiro [4 - tert - butylcyclohexane - 1,6' - (m - thiazane-2',4'-dione)]. | 215–217° C. |
| 12. Spiro [4 - tert - amylcyclohexane - 1,6' - (m - thiazane-2',4'-dione)]. | 170–185° C.[2] |
| 13. Spiro [cyclopentane-1,6'-(2'-imino-m-thiazane-4'-one)]. | 185–186° C. |
| 14. Spiro [cyclopentane - 1,6' - (m - thiazane - 2',4'-dione)]. | 125–126.5° C. |
| 15. Spiro [4 - cyclohexylcyclohexane - 1,6' - (m - thiazane-2',4'-dione)]. | 206–207° C. |
| 16. Spiro [cyclohexane-1,6'-(5'-ethyl-2'-imino-m-thiazane-4'-one)]. | 207–209° C. |
| 17. Spiro [cyclohexane-1,6'-(5'-ethyl-m-thiazane-2',4'-dione)]. | 132–134° C. |
| 18. Spiro (cyclopentane-1,6'-(2'-methylimino-3'-methyl-m-thiazane-4'-one)]. | 65–66° C. |
| 19. Spiro [cyclopentane 1,7'-(2',3',6',7'- tetrahydro-5' H-imidazo [2.1-b]-m-thiazane-5'-one)]. | 90–91° C. |
| 20. Spiro [cyclohexane - 1,6' - (2' - methylimino - 3'-methyl-m-thiazane-4'-one)]. | 89° C. |
| 21. Spiro [cyclohexane-1,6'-(2'-ethylimino-3'-ethyl-m-thiazane-4'-one)]. | 49–50° C. |
| 22. Spiro [4-methylcyclohexane-1,6'-(2'-methyl-imino-3'-methyl-m-thiazane-4'-one)]. | 79–80° C. |
| 23. Spiro [3-methylcyclohexane-1,6'-(2'-ethylimino-3'-ethyl-m-thiazane-4'-one)]. | Viscous oil, B. P. 113–115° C. at 0.15 mm. of Hg. |
| 24. Spiro [3 - methylcyclohexane - 1,7' - (2',3',6',7' - tetrahydro - 5'H - imidazo - [2',1' - b] - m-thiazane-5'-one)]. | 80–82° C. |
| 25. Spiro [4-isopropylcyclohexane-1,6'-(2'-methyl-imino-3'-methyl-m-thiazane-4'-one)]. | 68–110° C.[1] |
| 26. Spiro [4-tert-butylcyclohexane-1,6'-(2'-methyl-imino-3'-methyl-m-thiazane-4'-one)]. | 105–150° C.[1] |
| 27. Spiro [cycloheptane-1,6'-(2'-imino-m-thiazane-4'-one)]. | 179° C. |
| 28. Spiro (cycloheptane-1,6'-(m-thaizane-2',4'-dione)]. | 169–169.5° C. |
| 29. Spiro [cyclohexane-1,6'-(2'-imino-5'-methyl-m-thiazane-4'-one)]. | 198–200° C. |
| 30. Spiro [cyclohexane-1,6'-(5'-methyl-m-thiazane-2',4'-dione)]. | 188–189° C. |
| 31. Spiro [cyclopentane-1,6'-(5'-ethyl-2'-imino-m-thiazane-4'-one)]. | 197–199° C. |
| 32. Spiro [cyclopentane-1,6'-(5'-ethyl-m-thiazane-2',4'-dione)]. | 131–133° C. |
| 33. Spiro [4-methylcyclohexane-1,6'-(5'-ethyl-2'-imino-m-thiazane-4'-one)]. | 198–198.5° C. |
| 34. Spiro [4-methylcyclohexane-1,6'-(5'-ethyl-m-thiazane-2',4'-dione)]. | 106–112° C. |
| 35. Spiro [3-methylcyclohexane-1,6'-(5'-ethyl-m-thiazane-2',4'-dione)]. | Obtained in two forms, 177–178° C. and 106–123° C. |
| 36. Spiro [cyclohexane-1,6'-(5'-n-propyl-m-thiazane-2',4'-dione)]. | 124–125° C. |
| 37. Spiro [cyclohexane - 1,6' - (5' - isopropyl - m - thiazane-2',4'-dione)]. | White crystals.[3] |
| 38. Spiro [cyclohexane-1,6'-(5'-n-butyl-m-thiazane-2',4'-dione)]. | 74–75° C. |
| 39. Spiro [3,3,5 - trimethylcyclohexane - 1,6' - (5' - ethyl-m-thiazane-2',4'-dione)]. | White crystals[3] K. W. W. d. K. S. Mgvc. |
| 40. Spiro [cyclohexane-1,6'-(5'-n-amyl-m-thiazane-2',4'-dione)]. | Do.[3] |
| 41. Spiro [cyclohexane - 1,6' - (5',5' - dimethyl - m - thiazane-2',4'-dione)]. | Do.[3] |
| 42. Spiro [2-methylcyclohexane-1,6'-(2'-imino-m-thiazane-4'-one)]. | 176–179° C. |
| 43. Spiro [2-methylcyclohexane-1,6'-(m-thiazane-2',4'-dione)]. | 110–125° C. |

[1] Apparently a mixture of stereo isomers.
[2] Some imino compound present in product.
[3] Melting points not determined.

Other compounds of our invention not listed above can be prepared by the same general procedure as that described in Example I. For instance, compounds in which the alkyl substituents in the 5 position of the m-thiazane ring are lower alkyl groups such as, hexyl, heptyl and octyl, etc., and in which lower alkylimino groups in the 2 position of the m-thiazane ring are n-propyl, isopropyl, n-butyl, sec-butyl, tert-butyl, n-amyl and isoamyl, etc. Compounds of our invention having lower alkyl substituents on a spiro cyclopentyl ring are also prepared by the method of Example I.

We claim:

1. Compounds of the formula selected from the group consisting of

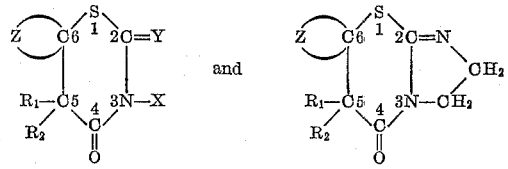

in which $R_1$, $R_2$ and X are substituents selected from the group consisting of H, and lower alkyl, Y is a substituent selected from the group consisting of oxygen, imino, and lower alkylimino, Z is a substituent selected from the group consisting of a polymethylene radical, a polymethylene radical substituted with from 1 to 3 lower alkyl radicals and a polymethylene radical substituted with a cyclohexyl radical, said polymethylene radicals having from 4 to 6 carbon atoms.

2. Spiro [cyclohexane-1,6'-(m-thiazane-2',4'-dione)].

3. Spiro [4 - methylcyclohexane - 1,6'-(5' - ethyl - m-thiazane-2',4'-dione)].

4. Spiro [cyclohexane-1,6'-(5-n-butyl-m-thiazane-2',4'-dione)].

References Cited in the file of this patent
UNITED STATES PATENTS

| | | |
| --- | --- | --- |
| 2,514,004 | Mathes et al. | July 4, 1950 |
| 2,585,064 | Wheeler et al. | Feb. 12, 1952 |
| 2,679,500 | Gash et al. | May 25, 1954 |